US011078988B2

(12) United States Patent
Schulz

(10) Patent No.: US 11,078,988 B2
(45) Date of Patent: Aug. 3, 2021

(54) TRANSMISSION ASSEMBLY

(71) Applicant: Aktiebolaget SKF, Gothenburg (SE)

(72) Inventor: Ingo Schulz, Gerolzhofen (DE)

(73) Assignee: AKTIEBOLAGET SKF, Gothenburg (SE)

( * ) Notice: Subject to any disclaimer, the term of this patent is extended or adjusted under 35 U.S.C. 154(b) by 90 days.

(21) Appl. No.: 16/424,630

(22) Filed: May 29, 2019

(65) Prior Publication Data
US 2019/0383360 A1     Dec. 19, 2019

(30) Foreign Application Priority Data

Jun. 13, 2018   (DE) .......................... 102018209447.0

(51) Int. Cl.
*F16H 1/28*      (2006.01)
*B25J 9/00*      (2006.01)
*F16H 57/08*     (2006.01)

(52) U.S. Cl.
CPC .............. *F16H 1/28* (2013.01); *B25J 9/0051* (2013.01); *F16H 57/082* (2013.01); *F16H 2001/2881* (2013.01)

(58) Field of Classification Search
CPC . F16H 1/28; F16H 57/082; F16H 3/54; F16H 3/48
See application file for complete search history.

(56) References Cited

U.S. PATENT DOCUMENTS 8,535,198 B2 *   9/2013   Fong ...................... F16H 1/2863
                                                          475/331
2018/0230902 A1*  8/2018   Desjardins .............. F16H 57/08

FOREIGN PATENT DOCUMENTS

DE     102014213669 A1   1/2016
EP         0787926 A2    8/1997
FR         2512907 A1    3/1983

* cited by examiner

*Primary Examiner* — Derek D Knight
(74) *Attorney, Agent, or Firm* — J-Tek Law PLLC; Scott T. Wakeman; Mark A. Ussai

(57) ABSTRACT

A transmission assembly includes a sun gear including an outer set of gear teeth, a planet carrier disposed around the sun gear, and a ring gear surrounding the planet carrier and the sun gear and including an inner set of gear teeth. At least one double planet is attached to the planet carrier. The double planet includes a first set of gear teeth and a second set of gear teeth, the outer set of gear teeth of the sun gear meshes with the first set of gear teeth, and the second set of gear teeth meshes with the inner set of gear teeth of the ring gear.

16 Claims, 3 Drawing Sheets

TRANSMISSION ASSEMBLY

CROSS-REFERENCE

This application claims priority to German patent application no. 10 2018 209 447.0 filed on Jun. 13, 2018, the contents of which are fully incorporated herein by reference.

TECHNOLOGICAL FIELD

The present disclosure relates to a transmission assembly including a sun gear, a planet carrier, a ring gear, and at least one double planet.

BACKGROUND

In robotics or other machines, a planetary transmission including a sun gear, a ring gear, and a planet carrier is often used for transmitting a drive force from a drive shaft to an output shaft. Gears and/or double planets can be used for transmitting the rotation between the elements. In planetary transmissions used to date, a plurality of gears or a plurality of double planets or a combination of these are required for force transmission between a sun gear and a planet carrier, or a planet carrier and a ring gear.

The planetary transmissions used to date, in which a plurality of gears or double planets are provided for force or rotation transmission between the sun gear and the planet carrier, and the planet carrier and the bridge, is a positive transmission. A "positive transmission" is understood to mean a transmission, wherein if it is implemented as a static transmission, the direction of rotation of the drive and of the output is identical. This means that when the planet carrier (at least in concept) is not rotating, the direction of rotation of the sun gear and of the ring gear is identical. With a high transmission ratio (e.g., i>29) this can lead to a self-locking of the transmission in one direction if the output changes into the drive (e.g., if a motor now acts as a generator).

SUMMARY

It is therefore an aspect of the present disclosure to provide a transmission assembly wherein the number of required gears and/or double planets can be reduced and wherein a self-locking can be avoided.

The transmission assembly includes a sun gear having an outer set of gear teeth, a planet carrier, and a ring gear having an inner set of gear teeth, wherein the planet carrier is disposed around the sun gear, and the ring gear surrounds the planet carrier and the sun gear. The transmission assembly further includes at least one double planet, wherein the at least one double planet is attached to the planet carrier.

In order to now reduce the number of gears and/or double planets required, in comparison to existing transmission assemblies for force transmission, it is provided in the disclosed transmission assembly that the double planet has a first set of gear teeth and a second set of gear teeth wherein the outer set of gear teeth of the sun gear meshes with the first set of gear teeth, and wherein the second set of gear teeth meshes with the inner set of gear teeth of the ring gear.

In this way a force transmission from the sun gear to the planet carrier (or the double planet that is attached to the planet carrier) and from the planet carrier to the ring gear can be effected by a single double planet. Further gears or double planets disposed therebetween are not required.

Due to the direct coupling between sun gear and planet carrier, as well as between the planet carrier and ring gear, the transmission assembly is implemented as a negative transmission. This means that with the planet carrier imagined to be stationary, the sun gear and the ring gear have opposite directions of rotation. The stationary gear ratio is therefore negative. A self-locking as described above can therefore be avoided.

The ring gear can serve as housing and be stationary. It is preferably one-part. A bending force flow can be effected here via the housing, i.e., via the ring gear, instead of via the planet carrier as is the case in other transmission assemblies including stationary planet carrier or stationary sun gear. Since the housing provides a greater stiffness than the planet carrier, the entire transmission assembly becomes more stable.

The sun gear can be connected to a drive or input shaft and act as drive. In this case the planet carrier acts as output and is therefore connected to an output shaft.

Alternatively the planet carrier can be connected to a drive or input shaft and act as drive. In this case the sun gear acts as output and is therefore connected to an output shaft. This embodiment can preferably be used in the field of parallel-arm robots, also called delta robots. A delta robot is based on kinematics wherein a platform of three to six linear axes or articulated arms disposed in parallel is guided; the articulated arms are supported in a fixed base. The platform can be provided with tools such as, for example, a gripping element. Such a kinematic system usually includes three to four articulated axes including stationary drives, for example, motors. These drives can be used with the transmission assembly described herein. The three-dimensional movement of the platform in the YXZ direction is effected via the coordinated actuation of all motors, wherein the platform can also tilt.

The planet carrier can alternatively be stationary and the output/drive can be effected via the sun gear and the ring gear. For example, this embodiment can be used for the drive of vehicles. Here the planet carrier is preferably fixedly connected to the vehicle and the sun gear is driven by a motor. In this case the ring gear serves as output to a rim or wheel.

According to one embodiment, the number of teeth of the first set of gear teeth is different from the number of teeth of the second set of gear teeth. Here the number of teeth of the first set of gear teeth can be greater than the number of teeth of the second set of gear teeth, or the number of teeth of the first set of gear teeth can be less than the number of teeth of the second set of gear teeth. Due to the different number of teeth, a translation of the rotational speed of the drive to the rotational speed of the output can be effected.

Bearings can be used for stabilizing the individual elements, which bearings, for example, support the planet carrier. The transmission assembly can therefore include at least one first bearing assembly that supports the sun gear with respect to the planet carrier. Furthermore the transmission assembly can include at least one second bearing assembly that supports the planet carrier with respect to the ring gear.

The first and the second bearing assembly can be tapered roller bearings, ball bearings, and/or plain bearings.

In some known transmission assemblies the bearing assemblies are exposed only to a low rotational speed, for example, if they are only connected to a slowly rotating output. This can lead to inadequate lubrication conditions since these bearing assemblies do not perform complete revolutions or rotate too slowly, and therefore the lubricant is not sufficiently distributed in the bearing assemblies. This can in turn lead to damage to the bearing assemblies and thus to an early failure of the bearing assemblies.

If the planet carrier is used as a drive, the bearing assemblies can be rotated with the rotation of the planet carrier, since all bearing assemblies are each connected to the planet carrier. In this way all bearing assemblies, in particular the bearing assemblies that are connected to the ring gear, can be rotated with a high rotational speed and a high number of revolutions, namely the rotational speed of the driving planet carrier. Furthermore the bearing assemblies are rotated by 360° and more by the planet carrier. The lubricant can therefore be distributed well in the bearing assemblies, which prevents the above-mentioned disadvantages.

The bearing assemblies can furthermore be equipped with a monitoring unit for monitoring the state of the bearings, for example, of the lubricant. Since the planet carrier is preferably connected to the drive, a high rotational speed (more than five revolutions per second) as well as complete revolutions of the bearing assemblies can be ensured. The monitoring unit can include a sensor that is located at a fixed position of the bearing inner ring or bearing outer ring. If the rotational speed is too slow, a noisy signal is generated by the sensor, since a sufficient signal amplitude is not generated by the movement. However, with the rotational speeds present here the generated signals are sufficient to determine a state of the bearing assemblies.

According to a further embodiment the transmission assembly can include at least one further double planet, which includes a first set of gear teeth and a second set of gear teeth. The at least one further double planet is attached to the planet carrier, wherein the outer set of gear teeth of the sun gear meshes with the first set of gear teeth, and wherein the second set of gear teeth meshes with the inner set of gear teeth of the ring gear.

Due to the use of two or more double planets, which are preferably disposed diametrically, the arrangement of the sun gear, of the planet carrier, and of the ring gear can be stabilized with respect to each other. Due to the second double planet a radial clearance can therefore be prevented between the ring gear, the planet carrier, and the sun gear.

In a further embodiment the transmission assembly can include at least one third double planet, and particularly preferably at least one fourth double planet. These double planets each include a first set of gear teeth and a second set of gear teeth, and are each attached to the planet carrier, wherein the outer set of gear teeth of the sun gear meshes with the first set of gear teeth, and wherein the second set of gear teeth meshes with the inner set of gear teeth of the ring gear. With the use of four double planets, which are preferably distributed evenly around the circumference, the force that acts on the planet carrier, the sun gear, and the ring gear can be distributed particularly well in the transmission assembly.

In order to minimize a clearance between the set of gear teeth n of the first double planet and the sun gear or the ring gear, the first set of gear teeth of the first double planet can furthermore be preloaded in the clockwise direction such that the first set of gear teeth of the first double planet is in contact with the set of gear teeth of the sun gear. Alternatively or additionally the second set of gear teeth of the first double planet can also be preloaded in the counterclockwise direction such that the second set of gear teeth of the first double planet is in contact with the set of gear teeth of the ring gear. In this way the sets of gear teeth of the first double planet can be preloaded in two different directions against the sun gear and the ring gear (tangentially): once in the clockwise direction, once in the counterclockwise direction. Due to this preload a contact can be generated between the set of gear teeth of the sun gear or of the ring gear and the set of gear teeth of the double planet. Furthermore, even in operation this contact can be maintained by the preload in different directions and a clearance between the sets of gear teeth thereby avoided.

If, as described above, a second double planet is used, the first set of gear teeth of the second double planet can also be preloaded in the counterclockwise direction such that the first set of gear teeth of the second double planet is in contact with the set of gear teeth of the sun gear. In addition, the second set of gear teeth of the second double planet can be preloaded in the clockwise direction such that the second set of gear teeth of the second double planet is in contact with the set of gear teeth of the ring gear. The clearance in the planetary transmission is thereby also reduced for the second double planet.

The clearance between the sun gear or the ring gear and the double planet can thus be prevented by the use of preloaded double planets. Due to the preload of the second double planet, which can be opposite to the preload of the first double planet, a clearance between the sets of gear teeth can be even better prevented. In addition, due to the uniform force distribution due to the two double planets, the radial clearance between the sun gear, the planet carrier, and the ring gear can be reduced. In particular the preload force can be identical here for all gears.

If such a transmission assembly, wherein the clearance between the sun gear or the ring gear and the double planets is prevented by the use of preloaded double planets, is used in a vehicle, a very precise drive can be realized, which in in particular in the case of driverless vehicles or also railbound drive systems makes possible a high positional accuracy of the entire vehicle.

The planet carrier can have a rotationally symmetrical shape. For example, it can be configured as a ring. Alternatively the planet carrier can also include a plurality of bridges or discrete arms.

Further advantages and advantageous embodiments are specified in the description, the drawings, and the claims. Here in particular the combinations of features specified in the description and in the drawings are purely exemplary, so that the features can also be present individually or combined in other ways.

In the following the disclosure shall be described in more detail using exemplary embodiments depicted in the drawings. Here the exemplary embodiments and the combinations shown in the exemplary embodiments are purely exemplary and are not intended to define the scope of the disclosure. This scope is defined solely by the pending claims.

DETAILED DESCRIPTION

In the following, identical or functionally equivalent elements are designated by the same reference numbers.

Figure 1:
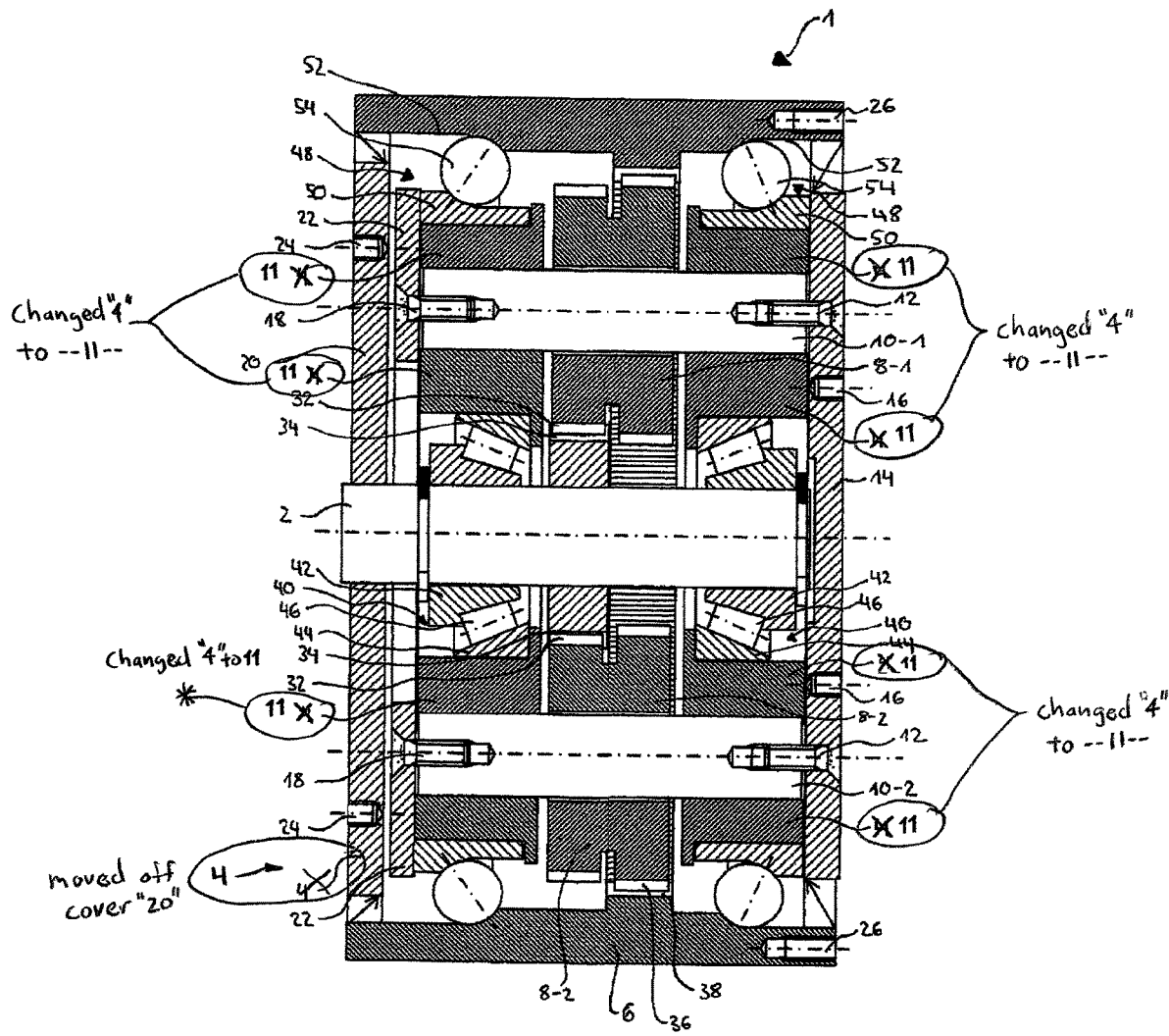
FIG. 1 is a sectional elevational view of a transmission assembly including a sun gear, a planet carrier, and a ring gear according to the present disclosure.

FIG. 1 shows a transmission assembly 1 including a sun gear 2, a planet carrier 4, and a ring gear 6. Such a transmission assembly 1 can be used as a joint in a robot unit such as, for example, a parallel-arm robot (see FIG. 2), or as a connection between a motor and a wheel in a motor vehicle (see FIG. 3).

Depending on the application, the sun gear 2, the planet carrier 4, or the ring gear 6 can be fixed. In the case depicted in FIG. 1 the ring gear 6 is fixed.

One side of the transmission assembly represents an output side, and the opposite side represents a drive side. The drive side can be connected to a motor. In the embodiment shown the sun gear 2 or the planet carrier 4 can optionally be driven via such a motor.

If the sun gear 2 is driven, a rotation of the sun gear is transmitted via planets 8, which are disposed on the planet carrier 4, to the planet carrier 4, and the planets 8 roll on the ring gear 6. If on the other hand the planet carrier 4 is driven, a rotation of the planet carrier is transmitted via the planets 8 to the sun gear 2, wherein the plants 8 also roll on the ring gear 6.

In the following the transmission assembly is described in detail with reference to FIG. 1.

The planet carrier 4 is disposed around the sun gear 2. The planet carrier 4 can have a ring shape and be equipped with a plurality of hubs 10-1, 10-2 that are disposed circumferentially around the sun gear 2 and two support members 11 disposed on each of the hubs 10-1, 10-2. The hubs 10-1, 10-2 can be attached to a cover 14 using attachment means 12. The cover 14 can in turn be connected to a drive or an output element via an attachment 24.

On the axially opposite side the planet carrier 4 is also connected to a cover 20 using attachment means 18. In addition, the transmission assembly 1 is also provided overall with a cover 22 that can be connected to a drive or output element via an attachment 24.

The ring gear 6 can be connected to a housing via an attachment 26 or can itself be configured as a housing.

In order to transmit a movement of the planet carrier 4 to the sun gear 2, double planets 8-1, 8-2 are provided on the planet carrier. These each include a first set of gear teeth 32 that mesh with an outer set of gear teeth 34 of the sun gear 2. The double planets 8-1, 8-2 also include a second set of gear teeth 36 that mesh with an inner set of gear teeth 38 of the ring gear 6. The rotation of the planet carrier 4 is transmitted or translated to the sun gear 2 by the first sets of gear teeth 32. The double planets 8-1, 8-2 roll on the ring gear 6 by the second sets of gear teeth 36.

The double planets 8-1, 8-2 are thus attached to the planet carrier 4 and mesh directly with the sun gear 2 and the ring gear 6. No further additional components such as, for example, gears or planets, are provided between the sun gear 2 and the planet carrier 4, and the planet carrier 4 and the ring gear 6. Due to this arrangement of the transmission assembly 1, the sun gear 2 and the ring gear 6 have opposite directions of rotation when the planet carrier 4 is imagined to be fixed, and the stationary gear ratio between them is negative. The transmission assembly 1 is thus a negative transmission.

The transmission assembly 1 can include bearing assemblies 40, 48 between the sun gear 2 and the planet carrier 4, as well as between the planet carrier 4 and the ring gear 6, for supporting the sun gear 2 and the planet carrier 4.

In the embodiment shown, two bearing assemblies 40 are disposed between the sun gear 2 and the planet carrier 4. These each include an inner ring 42 that is connected to the sun gear 2, and an outer ring 44 that is connected to the planet carrier 6. Rolling elements 46, in this case tapered rollers, are disposed between the inner ring 42 and the outer ring 44. Other types of rolling elements can also be used. Alternatively the bearing assembly 40 can also be a plain bearing.

Furthermore, in the embodiment shown two bearing assemblies 48 are disposed between the planet carrier 4 and the ring gear 6. The bearing assemblies 48 each include an inner ring 50, which is connected to the planet carrier 4, and an outer ring 52. The outer ring 52 can either be connected to the ring gear 6 or can be formed by the ring gear 6, as shown here. Rolling elements 54, in this case balls, are disposed between the inner ring 50 and the outer ring 52. Other types of rolling elements can also be used. Alternatively the bearing assembly 40 can also be a plain bearing.

Figure 2:
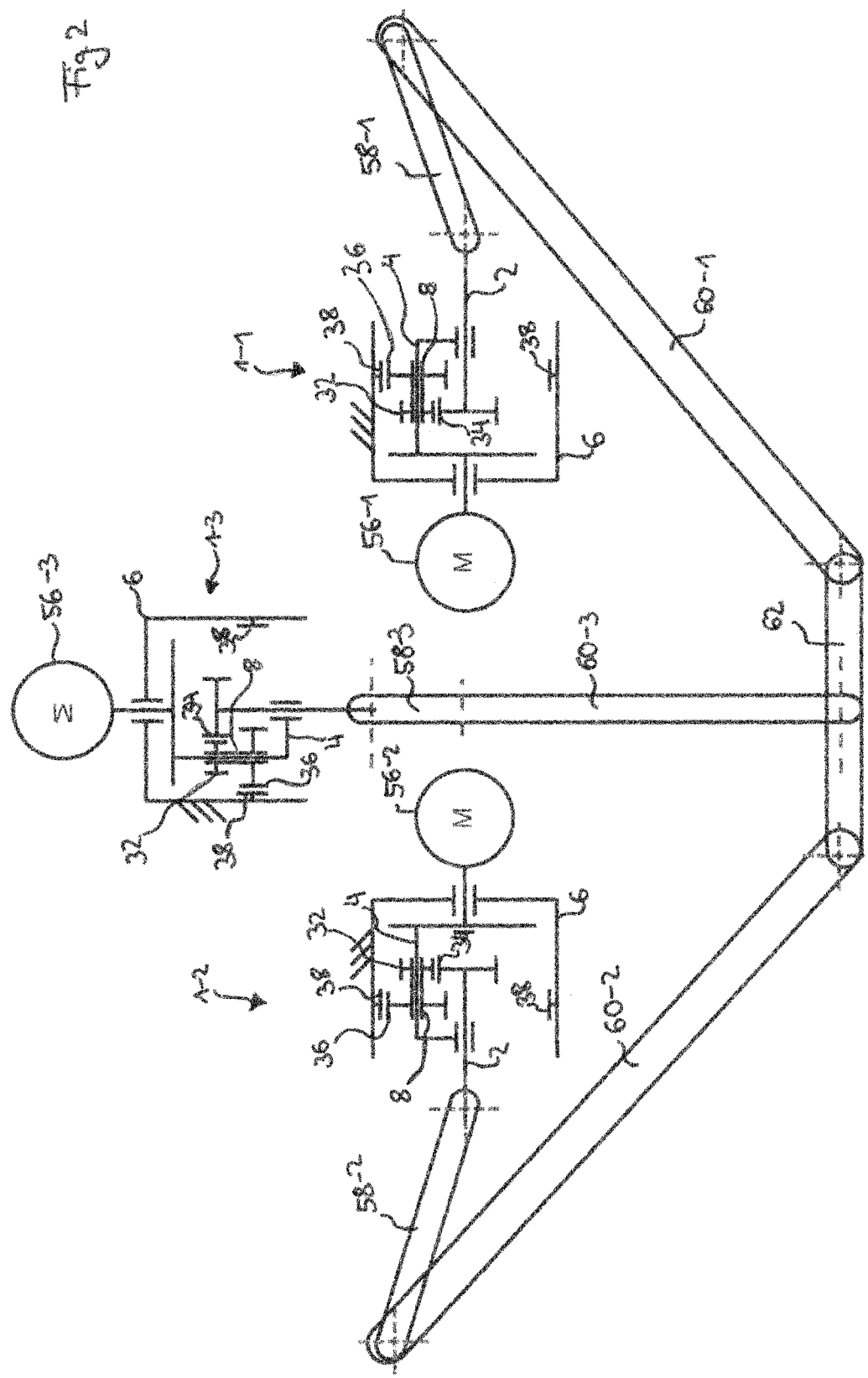
FIG. 2 is a schematic depiction of a parallel-arm robot including the transmission assembly of FIG. 1.

The transmission assembly described in FIG. 1 can be used, for example, in a parallel-arm robot, also called a delta robot, as shown in FIG. 2. In such a robot a platform 62 is suspended via arms 58, 60. Tools such as, for example, a gripping element, can be attached to the platform 62. Here the platform 62 is connected via a joint, for example, a ball joint, to a plurality of arm sections 60-1, 60-2, which are in turn connected to arm sections 58-1, 58-2, 58-3 via joints, for example, ball joints. The arm sections 58-1, 58-2, 58-3 are moved via three transmission assemblies 1-1, 1-2, 1-3. Since the arm sections 58 are disposed obliquely with respect to the respective transmission assembly 1, a rotation by the transmission assembly 1 leads to a conical movement of the respective arm section 58. The movement of the platform 62 can be controlled by these rotations.

The three transmission assemblies 1-1, 1-2, 1-3 are each driven by a motor 56-1, 56-2, 56-3. Since the transmission assemblies 1-1, 1-2, 1-3 are configured analogously, only one transmission assembly 1 is described below. The motor 56 drives the respective planet carrier 4, which translates its rotation via the planet 8 to the sun gear 2. The ring gear 6 is fixed. The sun gear 2 is coupled to the robot arm section 58 and moves it. Since the arm section 58 is disposed obliquely with respect to the transmission assembly 1, the rotation of the sun gear 2 is converted into a conical movement of the arm section 58.

Figure 3:
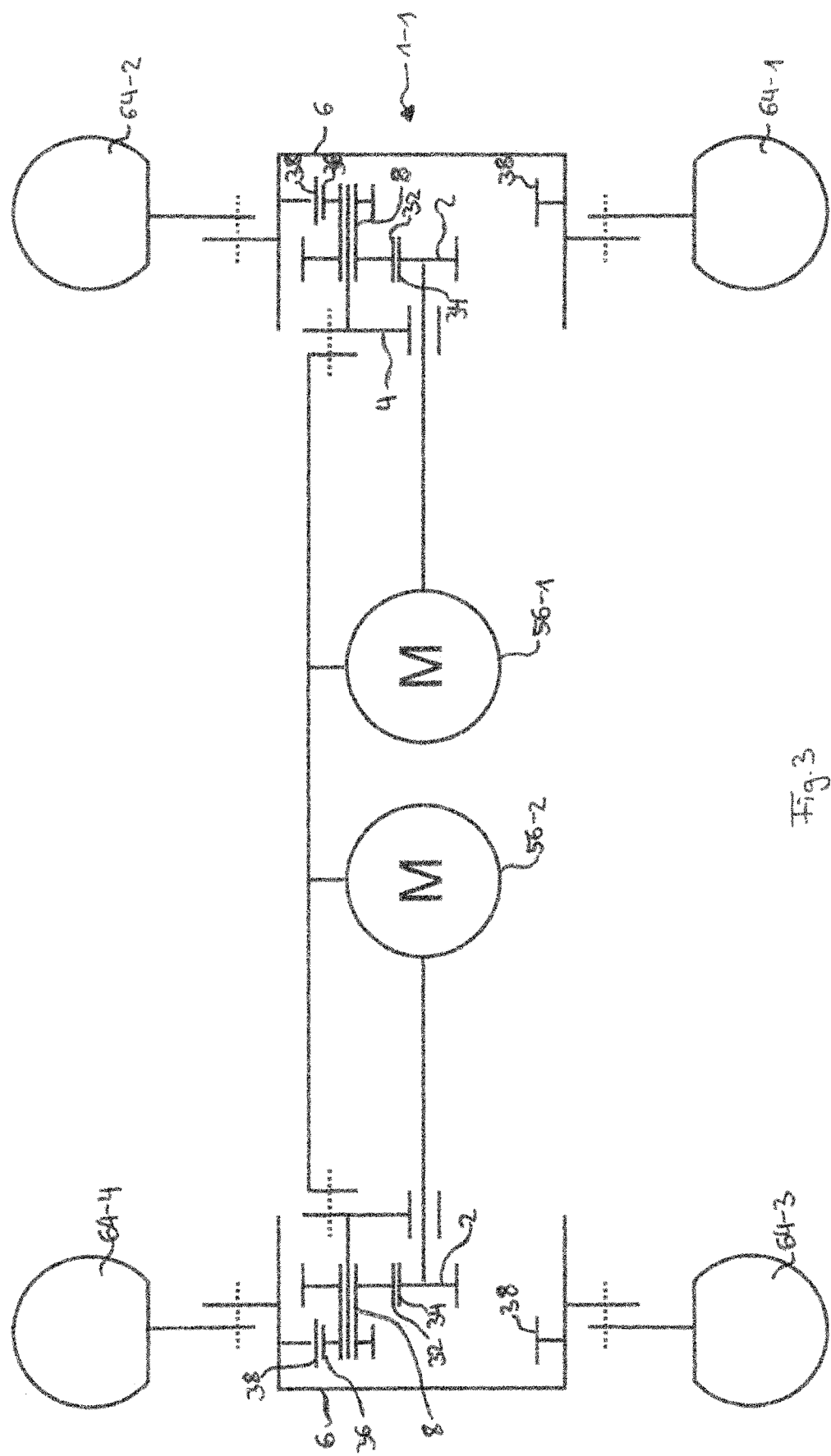
FIG. 3 is a schematic depiction of a motor-vehicle drive including the transmission assembly of FIG. 1.

In another embodiment the transmission assembly 1 can be used in a motor vehicle, in particular an electric vehicle, as shown in FIG. 3.

In this case two wheels 64-1, 64-2 and 64-3, 64-4 are respectively driven via two motors 56-1, 56-2. For this purpose a transmission assembly 1-1 is disposed between a motor 56-1 and the two wheels 64-1, 64-2, and a further transmission assembly 1-2 is disposed between the further motor 56-2 and the two wheels 64-3, 64-4. In contrast to FIG. 2, in this case the planet carrier 4 is fixedly connected to the vehicle, and the sun gear 2 is driven via the motor 56. The ring gear 6 drives the wheels 64.

In summary, in the transmission assembly disclosed here a force transmission from the sun gear to the planet carrier and from the planet carrier to the ring gear is realized by a single double planet or circumferentially distributed double planets. In this way further gears or double planets disposed therebetween can be avoided, whereby the total number of components can be reduced. Furthermore, the transmission can be implemented as a negative transmission by the direct coupling between sun gear and planet carrier. A self-locking, as can occur with positive transmissions, can therefore be avoided since the transmission assembly can be run both backwards and forwards.

Representative, non-limiting examples of the present invention were described above in detail with reference to the attached drawings. This detailed description is merely intended to teach a person of skill in the art further details for practicing preferred aspects of the present teachings and is not intended to limit the scope of the invention. Furthermore, each of the additional features and teachings disclosed above may be utilized separately or in conjunction with other features and teachings to provide an improved transmission assembly.

Moreover, combinations of features and steps disclosed in the above detailed description may not be necessary to practice the invention in the broadest sense, and are instead taught merely to particularly describe representative examples of the invention. Furthermore, various features of the above-described representative examples, as well as the various independent and dependent claims below, may be combined in ways that are not specifically and explicitly enumerated in order to provide additional useful embodiments of the present teachings.

All features disclosed in the description and/or the claims are intended to be disclosed separately and independently from each other for the purpose of original written disclosure, as well as for the purpose of restricting the claimed subject matter, independent of the compositions of the features and/or the claims. In addition, all value ranges or indications of groups of entities are intended to disclose every possible intermediate value or intermediate entity for the purpose of original written disclosure, as well as for the purpose of restricting the claimed subject matter.

REFERENCE NUMBER LIST

1 Transmission assembly
2 Sun gear
4 Planet carrier
6 Ring gear
8 Double planet
10 Hub
12 Attachment means
14 Cover
16 Attachment to drive
18 Attachment means
20 Cover
22 Cover
24 Attachment
26 Attachment to previous section
32 First set of gear teeth
34 Outer set of gear teeth of the sun gear
36 Second set of gear teeth
38 Inner set of gear teeth of the ring gear
40 Bearing assembly
42 Inner ring
44 Outer ring
46 Rolling element
48 Bearing assembly
50 Inner ring
52 Outer ring
54 Rolling element
56 Motor
58 Robot arm section
60 Robot arm section
62 Platform
64 Wheel

What is claimed is:

1. A transmission assembly comprising:
a sun gear including an outer set of gear teeth,
a planet carrier disposed around the sun gear,
a ring gear surrounding the planet carrier and the sun gear and including an inner set of gear teeth, and
at least one double planet attached to the planet carrier, wherein the double planet includes a first set of gear teeth and a second set of gear teeth,
wherein the outer set of gear teeth of the sun gear meshes with the first set of gear teeth,
wherein the second set of gear teeth meshes with the inner set of gear teeth of the ring gear, and
the transmission assembly further comprises two bearing assemblies rotatably supporting the sun gear with respect to the planet carrier, each bearing assembly being disposed on a separate axial side of the sun gear.

2. The transmission assembly according to claim 1, wherein a number of teeth of the first set of gear teeth is different from a number of teeth of the second set of gear teeth.

3. The transmission assembly according to claim 1, wherein a number of teeth of the first set of gear teeth is greater than a number of teeth of the second set of gear teeth.

4. The transmission assembly according to claim 1, wherein a number of teeth of the first set of gear teeth is smaller than a number of teeth of the second set of gear teeth.

5. The transmission assembly according to claim 1, including at least one first bearing assembly supporting the sun gear with respect to the planet carrier.

6. The transmission assembly according to claim 5, including at least one second bearing assembly supporting the planet carrier with respect to the ring gear.

7. The transmission assembly according to claim 1, including at least one further double planet that includes a first set of gear teeth and a second set of gear teeth,
wherein the at least one further double planet is attached to the planet carrier,
wherein the outer set of gear teeth of the sun gear meshes with the first set of gear teeth of the at least one further double planet, and
wherein the second set of gear teeth of the at least one further double planet meshes with the inner set of gear teeth of the ring gear.

8. The transmission assembly according to claim 7, wherein the first and the at least one further double planet are evenly distributed circumferentially.

9. The transmission assembly according to claim 1, wherein the planet carrier has a rotationally symmetric shape.

10. The transmission assembly according to claim 1, wherein the planet carrier has a ring shape.

11. A delta robot including the transmission assembly according to claim 1.

12. A motor vehicle motor including the transmission assembly according to claim 1.

13. The transmission assembly according to claim 1, wherein a number of teeth of the first set of gear teeth is different from a number of teeth of the second set of gear teeth,
and including:
at least one first bearing assembly supporting the sun gear with respect to the planet carrier and at least one second bearing assembly supporting the planet carrier with respect to the ring gear, and
at least one further double planet that includes a first set of gear teeth and a second set of gear teeth,
wherein the at least one further double planet is attached to the planet carrier, wherein the outer set of gear teeth of the sun gear meshes with the first set of gear teeth of the at least one further double planet, and wherein the second set of gear teeth of the at least one further double planet meshes with the inner set of gear teeth of the ring gear.

14. The transmission assembly according to claim 1, wherein the two bearing assemblies each include tapered rollers and are arranged facing the sun gear.

15. A transmission assembly comprising:

a sun gear including an outer set of gear teeth, a planet carrier disposed around the sun gear and including at least one hub, a ring gear surrounding the planet carrier and the sun gear and including an inner set of gear teeth, at least one double planet disposed on the hub of the planet carrier, and at least one support member disposed on the hub of the planet carrier, and wherein the double planet includes a first set of gear teeth and a second set of gear teeth, wherein the outer set of gear teeth of the sun gear meshes with the first set of gear teeth, wherein the second set of gear teeth meshes with the inner set of gear teeth of the ring gear, and wherein the transmission further comprises an inner bearing assembly supporting the sun gear with respect to the planet carrier and having an outer ring coupled with the support member and an outer bearing assembly supporting the planet carrier with respect to the ring gear and including an inner ring disposed about the support member.

16. A transmission assembly comprising:

a sun gear including an outer set of gear teeth, a planet carrier disposed around the sun gear, a ring gear surrounding the planet carrier and the sun gear and including an inner set of gear teeth, and at least one double planet attached to the planet carrier, wherein the double planet includes a first set of gear teeth and a second set of gear teeth, wherein the outer set of gear teeth of the sun gear meshes with the first set of gear teeth, wherein the second set of gear teeth meshes with the inner set of gear teeth of the ring gear, and wherein the transmission further comprises a bearing assembly supporting the planet carrier with respect to the ring gear and having an outer ring formed by the ring gear.

* * * * *